US012354822B2

(12) United States Patent
Ueki et al.

(10) Patent No.: US 12,354,822 B2
(45) Date of Patent: Jul. 8, 2025

(54) FUSE ELEMENT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Misato Ueki, Mie (JP); Yutaka Takata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 31 days.

(21) Appl. No.: 18/283,760

(22) PCT Filed: Mar. 10, 2022

(86) PCT No.: PCT/JP2022/010504
§ 371 (c)(1),
(2) Date: Sep. 22, 2023

(87) PCT Pub. No.: WO2022/209696
PCT Pub. Date: Oct. 6, 2022

(65) Prior Publication Data

US 2024/0177959 A1 May 30, 2024

(30) Foreign Application Priority Data

Mar. 30, 2021 (JP) ................................ 2021-057020

(51) Int. Cl.
*H01H 85/38* (2006.01)
*H01H 85/02* (2006.01)
*H01H 85/055* (2006.01)

(52) U.S. Cl.
CPC ...... *H01H 85/055* (2013.01); *H01H 85/0241* (2013.01); *H01H 85/38* (2013.01);
(Continued)

(58) Field of Classification Search
CPC ....... H01H 85/055–12; H01H 85/0241; H01H 2085/0275; H01H 85/046; H01H 85/38;
(Continued)

(56) References Cited

U.S. PATENT DOCUMENTS 10,796,873 B2 * 10/2020 Holland ............... H01H 85/046
2013/0076478 A1 * 3/2013 Christmann ........... H01H 85/06 337/293

(Continued)

FOREIGN PATENT DOCUMENTS

JP H10-050184 A 2/1998
JP 2001-339126 A 12/2001
JP 2009-259724 A 11/2009

OTHER PUBLICATIONS

International Search Report issued on May 17, 2022 for WO 2022/209696 A1 (4 pages).

*Primary Examiner* — Jacob R Crum
(74) *Attorney, Agent, or Firm* — Venjuris, P.C.

(57) ABSTRACT

It is aimed to provide a fuse element capable of interrupting an electrical circuit while suppressing the formation of carbide when an abnormal current is generated. A fuse element 10 is provided with an insulating base material 3 and a conductor layer 1 provided on a surface of the base material 3. The conductor layer 1 is physically ruptured at a temperature lower than a temperature, at which the conduc-
(Continued)

tor layer 1 is fused and cut, when the conductor layer 1 is energized and generates heat.

7 Claims, 2 Drawing Sheets

(52) U.S. Cl.
CPC ............... *H01H 2085/0275* (2013.01); *H01H 2085/383* (2013.01); *H01H 2085/388* (2013.01)

(58) Field of Classification Search
CPC ....... H01H 2085/383; H01H 2085/388; H05K 1/0293
See application file for complete search history.

(56) References Cited

U.S. PATENT DOCUMENTS

| | | | | |
|---|---|---|---|---|
| 2016/0365562 | A1* | 12/2016 | Sugiyama | H01M 50/55 |
| 2019/0006141 | A1* | 1/2019 | Tsumagari | H05K 1/0296 |
| 2021/0243879 | A1* | 8/2021 | Kiya | H05K 1/16 |

* cited by examiner

FUSE ELEMENT

CROSS REFERENCE TO RELATED APPLICATIONS

This application is a national phase of PCT application No. PCT/JP2022/010504, filed on 10 Mar. 2022, which claims priority from Japanese patent application No. 2021-057020, filed on 30 Mar. 2021, all of which are incorporated herein by reference.

TECHNICAL FIELD

The present disclosure relates to a fuse element.

BACKGROUND

In an electrical circuit, a small-size fuse is used for the purpose of protection from an abnormal current. A chip fuse is cited as an example of the small-size fuse. In the chip fuse, a pair of terminal electrodes are provided on an insulating board and those terminal electrodes are connected by a fusible conductor. When an abnormal current is generated, the fusible conductor is fused and cut by the heat generation of the fusible conductor itself or by the heat generation of a heating conductor film provided between the terminal electrodes together with the fusible conductor as disclosed in Patent Document 1.

Further, a flexible printed circuit board (FPC) may be used as a small-size fuse. The structure of the FPC is, for example, disclosed in Patent Document 2. A conductor layer for constituting a circuit pattern is provided on a surface of a base material. If the FPC is arranged between a pair of electrodes and the electrodes are connected by the conductor layer of the FPC, the conductor layer generates heat and is fused and cut when an abnormal current is generated between the electrodes.

PRIOR ART DOCUMENT

Patent Document

Patent Document 1: JP H10-050184 A

Patent Document 2: JP 2001-339126 A

SUMMARY OF THE INVENTION

Problems to be Solved

In a fuse element formed such that a conductor provided on an insulating base material is fused and cut like a chip fuse and a fuse configured using an FPC (FPC fuse), a member present near the conductor and containing an organic polymer may form carbide due to heat when the conductor is fused and cut. In addition to the base material constituting the chip fuse or the FPC, a protection layer for protecting the conductor layer and an adhesive layer for bonding the conductor layer and the base material are cited as examples of the member present near the conductor and possibly forming carbide when the conductor is fused and cut further in the case of the FPC. In those layers containing the organic polymer, the carbide formed as the conductor is fused and cut also includes an electrically conductive carbide. The electrically conductive carbide possibly forms an electrical conduction path between the electrodes. Then, even if the conductor is fused and cut when an abnormal current flows between the electrodes, a new electrical conduction path is formed by the carbide and an electrical circuit cannot be interrupted. That is, a function as the fuse cannot be sufficiently exhibited.

In view of the above, it is aimed to provide a fuse element capable of interrupting an electrical circuit while suppressing the formation of carbide when an abnormal current is generated.

Means to Solve the Problem

The present disclosure is directed to a fuse element with an insulating base material and a conductor layer provided on a surface of the base material, the conductor layer being physically ruptured at a temperature lower than a temperature, at which the conductor layer is fused and cut, when the conductor layer is energized and generates heat.

Effect of the Invention

The fuse element according to the present disclosure can interrupt an electrical circuit while suppressing the formation of carbide when an abnormal current is generated.

DESCRIPTION OF EMBODIMENTS OF PRESENT DISCLOSURE

Figure 1:
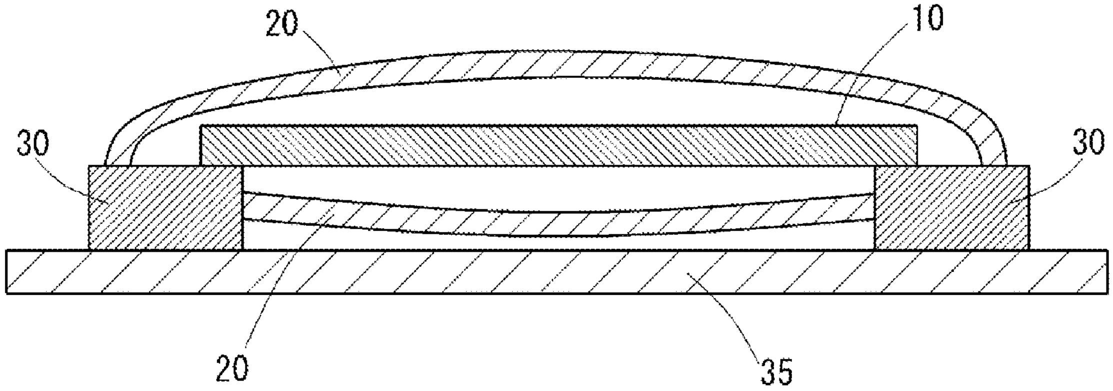
FIG. 1 is a section schematically showing a fuse element according to one embodiment of the present disclosure together with electrodes.

First, embodiments of the present disclosure are listed and described.

The fuse element of the present disclosure is provided with an insulating base material and a conductor layer provided on a surface of the base material, the conductor layer being physically ruptured at a temperature lower than a temperature, at which the conductor layer is fused and cut, when the conductor layer is energized and generates heat.

If the fuse element is provided in the middle of an electrical circuit to be interrupted when an abnormal current is generated and a circuit current flows via the conductor layer of the fuse element, the conductor layer is physically ruptured and the electrical circuit is interrupted before the conductor layer is fused and cut when the abnormal current is generated and heat is generated in the conductor layer. That is, the circuit is interrupted before the conductor layer reaches heat generation at a high temperature to be fused and cut. Thus, a situation hardly occurs where carbide is formed by high heat generated from the conductor layer in members present near the conductor layer and containing an organic polymer such as the base material and the interruption of the circuit is hindered by the formation of an electrical conduction path via electrically conductive carbide.

Here, the fuse element may be configured using a flexible printed circuit board (FPC), and the base material and the conductor layer of the fuse element may be respectively constituted by a base layer and a metal foil of the FPC. By using the FPC, a small-size fuse element can be easily and inexpensively formed.

The fuse element may further include a foam layer for covering a surface of the conductor layer, and the foam layer may contain a foaming agent and physically rupture the conductor layer by being foamed when the foaming agent is heated. Many foaming agents are foamed at a temperature lower than a temperature, at which the conductor layer is fused and cut. If the foaming agent is foamed, an impact is applied to the conductor layer and the conductor layer can be physically ruptured by a pressure of a gas generated at the time of foaming. Thus, by a simple means of providing the layer containing the foaming agent on the surface of the conductor layer, a fuse element can be configured which can interrupt the electrical circuit while suppressing the formation of carbide associated with the fused and cut conductor layer.

In this case, the foaming agent may have a foaming temperature of 200° C. or higher and 10% by mass of the foaming agent may be contained in the foam layer. If the foaming agent has the foaming temperature of 200° C. or higher, unintended foaming of the foaming agent is easily avoided in a fuse element manufacturing process and the like. Further, since a content of the foaming agent in the foam layer is 10% by mass or more, even if the foaming agent has a relatively high foaming temperature of 200° C. or higher or even if a configuration is adopted in which the foaming agent is hardly heated up to the foaming temperature such as because the foam layer is not directly in contact with the conductor layer, the conductor layer can be effectively ruptured by the foaming of the foaming agent when an abnormal current is generated.

The fuse element may be configured using an FPC, the base material and the conductor layer of the fuse element may be respectively constituted by a base layer and a metal foil of the FPC, and at least one of a protection layer for protecting a surface of the metal foil and an adhesive layer for bonding the metal foil and the base material may contain the foaming agent and function as the foam layer. If a general FPC provided with no foam layer is used as a fuse element, a situation easily occurs where an organic polymer constituting the base layer, the protection layer and the adhesive layer forms electrically conductive carbide as the conductor layer (metal foil) is fused and cut and a function as a fuse cannot be sufficiently fulfilled. However, by providing the foam layer and interrupting the electrical circuit by the rupture of the metal foil associated with the foaming of the foaming agent, such a situation can be effectively suppressed. Further, by making at least one of the protection layer and the adhesive layer the foam layer in the FPC, the FPC can be used as the fuse element for interrupting the electrical circuit without depending on whether or not the conductor layer has been fused and cut, without largely changing the structure of the conventional FPC.

The fuse element may further include a sheet layer for surrounding an outer periphery of a laminate including the base material, the conductor layer and the foam layer. In this case, when the foaming agent contained in the foam layer is foamed to emit a gas, that gas is confined in a space surrounded by the sheet layer. Then, an impact by a pressure of the gas is efficiently transmitted to the conductor layer and the conductor layer is ruptured. As a result, the fuse element can sensitively detect an abnormal current and interrupt the electrical circuit.

The foaming agent may not produce water when being foamed. Then, when the foaming agent is foamed, a situation can be avoided where an electrical conduction path is formed via water at a ruptured position of the conductor layer and the electrical circuit cannot be normally interrupted.

The foaming agent may contain at least one of an azo compound, a nitroso compound and a hydrazine derivative. These foaming agents efficiently generate a nitrogen gas by being heated and can be suitably used to interrupt the circuit by the rupture of the conductor layer.

DETAILS OF EMBODIMENT OF PRESENT DISCLOSURE

Hereinafter, a fuse element according to an embodiment of the present disclosure is described in detail using the drawings.

<Structure of FPC Fuse>

Figure 2:
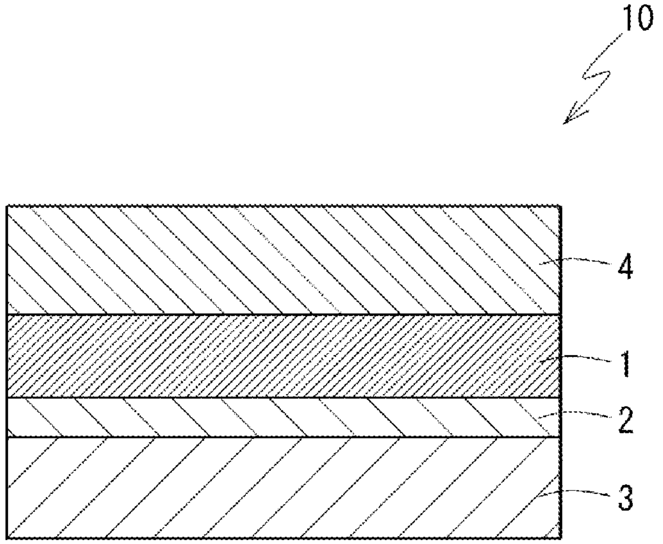
FIG. 2 is a section showing a layer configuration of the fuse element.

First, a FPC fuse configured using a flexible printed circuit board (FPC) is described as an example of a fuse element according to the present disclosure. FIG. 1 is a section schematically showing an FPC fuse 10 according to one embodiment of the present disclosure together with electrodes 30, 30 and the like. Further, FIG. 2 shows a layer configuration of a cross-section of the FPC fuse 10.

As shown in FIG. 1, the FPC fuse 10 is provided to connect a pair of the electrodes 30, 30 in the middle of an electrical circuit provided on a circuit board 35. As shown in FIG. 2, the FPC fuse 10 has a laminated structure of a plurality of layers. Specifically, the FPC fuse 10 includes a base layer (base material) 3 and a metal foil (conductor layer) 1 for covering at least one surface of the base layer 3. The base layer 3 and the metal foil 1 are bonded by an adhesive layer 2. A protection layer 4 is provided on a surface of the metal foil 1. The protection layer 4 may be fixed to the surface of the metal foil 1 via a layer (not shown) of an adhesive. Such a laminated structure is adopted in a conventional general and versatile FPC.

The base layer 3 is configured as an insulating base material. A material for constituting the base layer 3 is not particularly limited, but a flexible polymer material used as a base layer of a general FPC such as polyethylene terephthalate (PET) or polyimide (PI) can be suitably used. A copper foil, which is a material used in a general FPC, is preferably used as the metal foil 1. A thickness of the metal foil 1 is preferably m or more in terms of ensuring sufficient electrical conductivity. On the other hand, the thickness of the metal foil 1 is preferably 50 μm or less in terms of making the metal foil 1 easily ruptured by the foaming of a foaming agent to be described later. A constituent material of the adhesive layer 2 is also not particularly limited, and an acrylic-based, epoxy-based, urethane-based or silicone-based adhesive or the like may be used.

The protection layer 4 covers the surface of the metal foil 1 and is provided as an outermost layer of the FPC fuse 10. A protection layer is also called as a coverlay and functions to protect a surface of a metal foil while insulating in an FPC. A protection layer is configured as a sheet member mainly containing an organic polymer such as a polyimide film in a conventional general FPC, but the protection layer 4 is configured as a foam layer containing a foaming agent in the FPC fuse 10 according to this embodiment. The configuration and function of the protection layer 4 serving as the foam layer are described in detail later. As described later, the fuse element of the present disclosure can also be configured other than as the FPC fuse 10, but the fuse element can be made flexible by being the FPC fuse 10 and easily formed using the inexpensively mass-producible FPC.

Further, in the FPC fuse 10 according to this embodiment, a sheet layer 20 for surrounding the outer periphery of a body portion of the FPC fuse 10 is preferably provided as shown in FIG. 1 although it is arbitrary. The sheet layer 20 is provided to airtightly surround the outer periphery of the entire body portion of the FPC fuse 10 described above. A material for constituting the sheet layer 20 is not particularly limited, but polyolefins, vinyl chlorides, fluororesins including polytetrafluoroethylene and the like can be illustrated as such. A sheet (film) made of one of those polymer materials may be wound around a region crossing the two electrodes 30, 30. Note that although a space is shown between the FPC fuse 10 and the sheet layer 20 for clear graphical representation in FIG. 1, the sheet layer 20 is, in fact, preferably arranged in as close contact with the FPC fuse 10 as possible.

<Protection Layer as Foam Layer>

In the FPC fuse 10 according to this embodiment, the protection layer 4 is configured as the foam layer containing the foaming agent. The forming agent is a substance which is foamed by being heated, i.e. a substance which produces a gas in association with thermal decomposition. In the protection layer 4, the forming agent is contained in an unfoamed state. Preferably, particles of the forming agent are dispersed in the organic polymer material.

As shown in FIG. 1, the FPC fuse 10 is arranged between the pair of electrodes 30, 30 and the electrodes 30, 30 can be electrically connected by the metal foil 1 covered by the protection layer 4. A case is considered where an abnormal current (abnormally large current) is generated between the electrodes 30, 30 in this state.

If the abnormal current flows in the metal foil 1, the metal foil 1 generates heat due to electrical resistance. The heat generated in the metal foil 1 is also transferred to the protection layer 4 to heat the protection layer 4. Then, the forming agent contained in the protection layer 4 is heated and foamed. That is, the forming agent is thermally decomposed while producing a gas. The produced gas rapidly diffuses to the surroundings while expanding. An impact is applied to surrounding members by a pressure of the expanding gas. The impact associated with gas production is also applied to the metal foil 1, and the metal foil 1 is physically ruptured by that impact. Note that the rupture of the metal foil 1 indicates the breakage of the continuity of the material in a plane of the metal foil 1.

If the metal foil 1 is ruptured over an entire region in a thickness direction in association with the foaming of the forming agent, conduction between the electrodes 30, 30 via the metal foil 1 is blocked. Then, the electrical circuit is interrupted at the position of the FPC fuse 10. In this way, the electrical circuit can be protected from the abnormal current by interrupting the electrical circuit by the foaming of the forming agent contained in the protection layer 4 when the abnormal current is generated. Generally, a decomposition temperature at which the forming agent is foamed is drastically lower than a melting point and a sublimation point of a metal. Thus, when the metal foil 1 generates heat due to the abnormal current, the foaming of the forming agent occurs before the metal foil 1 is fused and cut due to the heat generation thereof. That is, if the heat generation of the metal foil 1 is started, the foaming of the forming agent occurs at an early stage and the metal foil 1 is ruptured. After the rupture of the metal foil 1, no current flows in the metal foil 1, wherefore the metal foil 1 is neither fused nor cut.

As described as the background art, a conventional general FPC containing no forming agent in a protection layer may also be used as a fuse. In this case, when an abnormal current is generated, a metal foil is fused and cut due to heat generation, whereby an electrical circuit is interrupted. In this form, when an abnormal current is generated, heating to a high temperature equal to or higher than a melting point or sublimation point of the metal foil locally occurs in the FPC. Then, carbide may be formed in layers present near the metal foil and containing an organic polymer, i.e. a base layer, an adhesive layer and the protection layer due to that high temperature. Carbides include electrically conductive ones. If the electrically conductive carbide is formed, there is a possibility that an electrical conduction path via the electrically conductive carbide is formed at positions where the conduction of the metal foil is blocked by the fused and cut metal foil. Then, the conduction of the metal foil is not blocked or the conduction once blocked by the fused and cut metal foil is formed again. As a result, despite that the metal foil was fused and cut, conduction in the electrical circuit is not actually interrupted or the conduction once blocked is formed again. Therefore, the electrical circuit cannot be protected from an abnormal current.

In contrast, in the FPC fuse 10 according to this embodiment, the metal foil 1 is not fused or cut by a high temperature, but physically ruptured by the foaming of the foaming agent and the conduction of the metal foil 1 can be blocked before reaching a high temperature to form carbide in the surrounding layers. That is, a situation where a conduction path is formed again at the position where the conduction was blocked due to the contribution of the electrically conductive carbide hardly occurs and the electrical circuit can be properly protected from the abnormal current. Further, if the rupture of the metal foil 1 due to the foaming of the foaming agent does not spread in the entire region of the metal foil 1 in the thickness direction and the metal foil 1 remains to be continuous at some positions in the thickness direction, the conduction cannot be blocked unless the metal foil 1 is fused and cut. However, since the metal foil 1 already having a small thickness is fused and cut, the amount of heat generation until the metal foil 1 is fused and cut is suppressed to be small. Thus, the production of the carbide and the formation of the conduction path by the carbide can be suppressed to be small as compared to the case where the foaming agent is not used and the conduction is blocked only by fusing and cutting the metal foil 1. In this way, the protection layer 4 adjacent to the metal foil 1 is configured as the foam layer containing the foaming agent and the metal foil 1 is ruptured at least in a partial region in the thickness direction by the foaming of the foaming agent, whereby the electrical circuit can be interrupted while the formation of the carbide is suppressed when an abnormal current is generated in the electrical circuit.

Further, if the outer periphery of the FPC fuse 10 is surrounded by the sheet layer 20, a gas produced by the thermal decomposition of the foaming agent is confined in a space surrounded by the sheet layer 20 without being diffused to outside. In that way, a pressure in the space surrounded by the sheet layer 20 increases and a high gas pressure is also applied to the metal foil 1. Then, the metal foil 1 is easily ruptured by an impact caused by the gas pressure. That is, when an abnormal current is generated, the FPC fuse 10 responses to the abnormal current with a high sensitivity and interrupts the circuit.

The type of the foaming agent contained in the protection layer 4 is not particularly limited, but a thermal decomposition temperature is preferably 150° C. or higher, further 170° C. or higher, 200° C. or higher. Then, it is possible to suppress the foaming caused by heating due to factors other than an abnormal current such as a temperature increase of an external environment, slight heat generation due to an increase of a current not regarded as an abnormal current and a step at the time of fabricating the protection layer 4 and the like. On the other hand, the thermal decomposition temperature of the foaming agent is preferably 250° C. or lower. Then, the electrical circuit is easily interrupted due to sensitive reaction with the generation of an abnormal current, and the formation of the carbide from the organic polymer material until the rupture of the metal foil 1 can be effectively suppressed. Further, the gas generated when the foaming agent is foamed preferably does not contain water (steam). This is to suppress the formation of a conduction path via water due to the adhesion of water to the ruptured position of the metal foil 1 and the vicinity thereof.

The type of the specific foaming agent is also not particularly limited, and organic compounds such as azo compounds, nitroso compounds, hydrazine derivatives and hydrocarbons and inorganic compounds such as sodium carbonate can be illustrated. It is preferable to use foaming agents made of azo compounds, nitroso compounds and hydrazine derivatives, out of these. These compounds often produce a nitrogen gas without containing water at the time of foaming, and have high foaming efficiency in many cases. Azodicarbonamide, barium azodicarboxylate and the like can be cited as examples of the azo compound. N,N'-nitrosopentamethylenetetramine and the like can be cited examples of the nitroso compound, and hydrazodicarbonamide, 4, 4'-oxybis(benzenesulfonyl hydrazide) and the like are cited as examples of the hydrazine derivative. One type of the foaming agent may be used or two or more types of the foaming agents may be used in combination.

A content of the foaming agent in the protection layer 4 is not particularly limited, but preferably 5% by mass or more, further 10% by mass or more of the entire protection layer 4 in terms of effectively rupturing the metal foil 1 by foaming. On the other hand, the content of the foaming agent is preferably suppressed to 30% by mass or less in terms of enhancing close contact between the protection layer 4 and the metal foil 1. As listed in the next section “Other Forms”, the content of the foaming agent in the protection layer 4 is preferably set in a large range of 10% by mass or more in terms of enhancing the reliability of the rupture of the metal foil 1 by the foaming of the foaming agent when an abnormal current is generate when such a structure is adopted that heat generated in the metal foil 1 is hardly transferred to the protection layer 4, such as when another layer is interposed between the protection layer 4 and the metal foil 1, and when a foaming temperature of the foaming agent is a high temperature such as 200° C. or higher. A thickness of the protection layer 4 is also not particularly limited, but is preferably 30 m or more in terms of sufficiently exhibiting an effect of protecting the metal foil 1. On the other hand, the thickness of the protection layer 4 is preferably 1 mm or less, such as in terms of enhancing the flexibility of the FPC fuse.

In the protection layer 4, the type of the organic polymer, in which the foaming agent is dispersed, is not particularly limited, but silicone resins, epoxy resins, urethane resins and the like can be illustrated. Particularly, the use of silicone resins is preferable, such as in terms of difficulty in forming carbide during heating. Only one type of the organic polymer may be used or two or more types of the organic polymers may be mixed. Further, the protection layer 4 may contain an additive other than the foaming agent as long as this additive does not inhibit the foaming of the foaming agent. Heat-insulating fillers such as glass bubbles and calcium carbonate can be illustrated as such additives.

<Other Forms>

A form in which the protection layer 4 in contact with the metal foil 1 in the FPC fuse 10 is the foam layer containing the foaming agent was described above as an example of the embodiment of the present disclosure. However, the fuse element of the present disclosure is not limited to such a form.

In the case of configuring the fuse element of the present disclosure as the FPC fuse 10, the foaming agent is contained not only in the protection layer 4, but also in the adhesive layer 2 bonding the metal foil 1 and the base layer 3. That is, at least one of the protection layer 4 and the adhesive layer 2 may contain the foaming agent and function as a foam layer. The protection layer 4 containing the foaming agent is excellent in low possibility of erroneous foaming during manufacturing, whereas the adhesive layer 2 containing the foaming agent is excellent in easy transfer of heat generated in the metal foil 1 to the foaming agent. In the case of providing a layer of an adhesive between the metal foil 1 and the protection layer 4, a foaming agent may be contained in that adhesive layer.

Further, the foam layer is preferably directly in contact with the metal foil 1 like the protection layer 4 and the adhesive layer 2 of the FPC fuse 10 described above, but the foam layer may cover the metal foil 1 via another layer if this layer does not hinder the rupture of the metal foil 1 by the foaming of the foaming agent. For example, a foam layer may cover a metal foil via a base material (base layer) and/or a layer of an adhesive as in protection layers of samples used in Examples described later.

Furthermore, the fuse element of the present disclosure is not limited to the form configured using the FPC. The fuse element may be formed as a laminated structure including an insulating base material, a conductor layer provided on a surface of the base material and a foam layer for covering a surface of the conductor layer directly or via another layer. The foam layer may be configured to contain a foaming agent and physically rupture the conductor layer by the foaming of the foaming agent during heating. The base material, the conductor layer and the foam layer constituting the above laminated structure respectively correspond to the base layer 3, the metal foil 1 and the protection layer 4 in the FPC fuse 10. Besides the form using the FPC, structures such as a pattern fuse provided as a circuit pattern on a printed board and a chip fuse mounted on a printed board can be cited as examples of the form of the fuse element having the laminated structure. Also in the case of configuring the fuse element in the form other than the FPC fuse 10, a surrounding body capable of confining a gas produced by foaming such as a sheet layer is preferably provided on the outer periphery of a laminate including a base material, a conductor layer and a foam layer. Further, the fuse element of the present disclosure is not limited to the one formed to rupture the conductor layer using the foaming of the foaming agent and may be such that a conductor layer is physically ruptured at a temperature lower than a temperature, at which the conductor layer is fused and cut, when the conductor layer provided on a surface of a base material is energized and generates heat.

Examples

Examples are described below. Note that the present invention is not limited by these examples.

<Fabrication of Samples>

An FPC fuse was prepared by providing base layers on both surfaces of a copper foil via adhesive layers and providing a protection layer on a surface of one of those base layers. In this FPC fuse, the base layer was a polyimide resin layer having a thickness of m, the adhesive layer was an epoxy resin layer having a thickness of 10 μm and a conductor layer was the copper foil having a thickness of 35 μm. A layer having a thickness of 50 μm was fabricated as the protection layer using a material obtained by adding the following forming agent in a silicone resin ("CV9204-20" produced by Dow Toray Co., Ltd.). In Samples 1 to 5, the presence or absence, the type and the addition amount of the forming agent were as shown Table 1 below. Further, the outer periphery of the formed FPC fuse was airtightly surrounded by a film made of polytetrafluoroethylene resin.

Foaming agent A: "Neocellborn" produced by Eiwa Chemical Ind. Co., Ltd. (4, 4'-oxybis(benzenesulfonyl hydrazide)-based; foaming temperature of 160° C.)

Foaming agent B: "Vinyfor" produced by Eiwa Chemical Ind. Co., Ltd. (azodicarbonamide-based; foaming temperature of 208° C.)

<Test Method>

The fabricated FPC fuse was connected to a direct-current power supply, and a current of 1.5 A was caused to flow for 60 sec. During this time, whether or not a circuit was interrupted by the FPC fuse was confirmed. When the circuit was interrupted, the external appearance of the FPC fuse was visually observed and it was confirmed that the circuit had been interrupted not by the fused and cut copper foil, but by physical rupture.

<Results>

Figure 3:
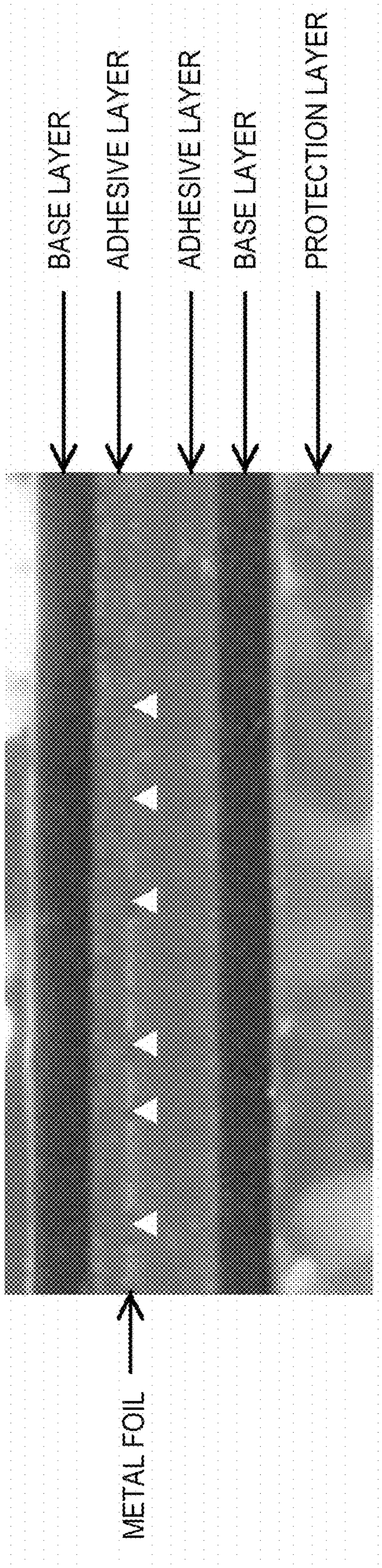
FIG. 3 is a microscopic picture of a cross-section showing the fuse element in a state where a metal foil is ruptured by the foaming of a foaming agent.

The types and addition amounts (ratios in the entire protection layers) of the forming agents added to the protection layers and the presence or absence of circuit interruption caused by the rupture of the copper foil are compiled in Table 1 below. Further, FIG. 3 shows a microscopic picture obtained by photographing a cross-section of the FPC fuse after the circuit interruption for Sample 4.

TABLE 1

| | Foaming Agent | Circuit Interruption by Copper Foil Rupture |
|---|---|---|
| Sample 1 | No foaming agent | No |
| Sample 2 | Foaming agent A: 20% by Mass | No |
| Sample 3 | Foaming agent B: 5% by Mass | No |
| Sample 4 | Foaming agent B: 10% by Mass | Yes |
| Sample 5 | Foaming agent B: 20% by Mass | Yes |

According to Table 1, the circuit was interrupted by energization in Sample 4. As shown by triangles in FIG. 3 showing the cross-section of Sample 4 after the circuit interruption, there are seen many positions where the continuity of the copper foil is broken in a plane of the copper foil. These positions can be associated with the rupture of the copper foil. From these results, it is confirmed that the circuit was interrupted not by the fused and cut copper foil, but by the rupture of the copper foil associated with the forming of the forming agent contained in the protection layer in the FPC fuse.

According to Table 1, the circuit interruption occurred in Samples 4, 5 in which 10% by mass or more of the forming agent B having a foaming temperature of 200° C. or higher was contained in the protection layer, but the circuit interruption did not occur even if 20% by mass of the forming agent was added in Sample 2 in which the forming agent A having a foaming temperature below 200° C. was added. This is thought to be because the forming agent was already foamed due to a low forming temperature of the forming agent while the protection layer was formed in the FPC fuse. By studying forming conditions of the protection layer and the like, the forming agent A is also thought to sufficiently withstand use as a forming agent to be added to a protection layer if the foaming of the forming agent at the time of fabricating the protection layer can be suppressed. Further, in Sample 3 in which a content of the foaming agent B was less than 10% by mass, the circuit interruption did not occur. This is interpreted such that a foaming amount sufficient to reach the rupture of the metal foil could not be secured due to a high foaming temperature of the foaming agent B and poor thermal transfer efficiency from the metal foil to the protection layer caused by the base layer and the adhesive layer interposed between the protection layer and the metal foil. When a foaming agent having a low foaming temperature is used or when thermal transfer efficiency from the metal foil to the protection layer is improved such as by providing the protection layer directly in contact with the metal foil, it is thought that sufficient foaming is caused and the circuit can be interrupted by the rupture of the metal foil when an abnormal current is generated even if a content of the foaming agent is below 10% by mass.

Although the embodiment of the present disclosure has been described in detail above, the present invention is not limited to the above embodiment at all and various changes can be made without departing from the gist of the present invention.

LIST OF REFERENCE NUMERALS

10 FPC fuse (fuse element)
1 metal foil (conductor layer)
2 adhesive layer
3 base layer (base material)
4 protection layer (foam layer)
20 sheet layer
30 electrode
35 circuit board

What is claimed is:

1. A fuse element, comprising:

an insulating base material;

a conductor layer provided on a surface of the base material; and a foam layer for covering a surface of the conductor layer, the foam layer containing a foaming agent that is heated by a heating of the conductor layer such that the conductor layer may be physically ruptured by being foamed when the foaming agent is heated, the conductor layer being physically ruptured when the conductor layer is energized by an abnormal current, the physical rupture of the conductor layer interrupting circuit operation and occurring at a temperature lower than a temperature at which the conductor layer would be fused and cut without the foam layer.

2. The fuse element of claim 1, wherein:

the fuse element is configured using a flexible printed circuit board, and the base material and the conductor layer of the fuse element are respectively constituted by a base layer and a metal foil of the flexible printed circuit board.

3. The fuse element of claim 1, wherein the foaming agent has a foaming temperature of 200° C. or higher and 10% by mass of the foaming agent is contained in the foam layer.

4. The fuse element of claim 2, wherein:

at least one of a protection layer for protecting a surface of the metal foil and an adhesive layer for bonding the metal foil and the base material contains the foaming agent and functions as the foam layer.

5. The fuse element of claim 1, further comprising a sheet layer for surrounding an outer periphery of a laminate including the base material, the conductor layer, and the foam layer.

6. The fuse element of claim 1, wherein the foaming agent does not produce water when being foamed.

7. The fuse element of claim 1, wherein the foaming agent contains at least one of an azo compound, a nitroso compound, and a hydrazine derivative.

* * * * *